United States Patent
Bates et al.

(10) Patent No.: US 8,200,825 B2
(45) Date of Patent: Jun. 12, 2012

(54) SERVER SYSTEMS

(75) Inventors: Phil Bates, Derbyshire (GB); Jeremy Young, Belfast (IE); Paul Moore, Belfast (IE); Sean Dynan, Belfast (IE)

(73) Assignee: Raritan Computer Inc., Somerset, NJ (US)

( * ) Notice: Subject to any disclaimer, the term of this patent is extended or adjusted under 35 U.S.C. 154(b) by 428 days.

(21) Appl. No.: 10/479,392

(22) PCT Filed: Feb. 27, 2002
(Under 37 CFR 1.47)

(86) PCT No.: PCT/GB02/00787
§ 371 (c)(1),
(2), (4) Date: Dec. 9, 2004

(87) PCT Pub. No.: WO02/069602
PCT Pub. Date: Sep. 6, 2002

(65) Prior Publication Data
US 2005/0120116 A1  Jun. 2, 2005

(30) Foreign Application Priority Data
Feb. 27, 2001 (GB) .................................. 0104836.2

(51) Int. Cl.
*G06F 15/16* (2006.01)
*G06F 15/173* (2006.01)
(52) U.S. Cl. ........................................ 709/227; 709/224
(58) Field of Classification Search .......... 709/220–236, 709/246, 203, 217, 200; 710/31, 62, 100; 711/202; 340/825.8
See application file for complete search history.

(56) References Cited

U.S. PATENT DOCUMENTS

| | | | |
|---|---|---|---|
| 5,257,390 A | | 10/1993 | Asprey |
| 5,268,676 A | | 12/1993 | Asprey et al. |
| 5,353,409 A | | 10/1994 | Asprey et al. |
| 5,617,547 A | * | 4/1997 | Feeney et al. ............... 710/316 |
| 5,721,842 A | | 2/1998 | Beasley |
| 5,727,159 A | * | 3/1998 | Kikinis ........................ 709/246 |
| 5,732,212 A | * | 3/1998 | Perholtz et al. ............. 709/224 |

(Continued)

FOREIGN PATENT DOCUMENTS
EP        1049305 A1    11/2000
(Continued)

OTHER PUBLICATIONS

Video Delivery Project Plan Presented by C-C-C hereinafter "Exhibit 3", Oct. 28, 1996, pp. 1-47. Refer to CCC.pdf.*

(Continued)

*Primary Examiner* — Moustafa M Meky
*Assistant Examiner* — Hee Kim

(57) ABSTRACT

The present invention comprises a system for the control of multiple remote resources. A plurality of user stations, each comprising a keyboard, video screen and a mouse, communicate with a server management unit. The server management unit is comprised of a server chassis, matrix switch and a switch server. Remote resources are each connected to a port of a multiplexer or to a server interface. A user station connects to a remote resource by making a request to the server management unit. The switch server identifies the multiplexer or server interface port to which the resource is connected from a database. A request is made to a remote interface server connected to the multiplexer and server interfaces and the remote interface server connects the appropriate ports of the server management unit and the multiplexer or server interface.

20 Claims, 1 Drawing Sheet

U.S. PATENT DOCUMENTS

| | | | | | |
|---|---|---|---|---|---|
| 5,734,831 | A | * | 3/1998 | Sanders | 709/223 |
| 5,884,096 | A | | 3/1999 | Beasley | |
| 5,917,426 | A | * | 6/1999 | Yoshifuji | 340/2.26 |
| 5,937,176 | A | | 8/1999 | Beasley | |
| 5,941,951 | A | * | 8/1999 | Day et al. | 709/233 |
| 5,978,389 | A | | 11/1999 | Chen | |
| 6,112,264 | A | * | 8/2000 | Beasley et al. | 710/38 |
| 6,119,148 | A | | 9/2000 | Chen | |
| 6,125,112 | A | | 9/2000 | Koning et al. | |
| 6,138,191 | A | | 10/2000 | Fujii et al. | |
| 6,182,123 | B1 | * | 1/2001 | Filepp et al. | 709/217 |
| 6,192,423 | B1 | * | 2/2001 | Graf | 710/31 |
| 6,304,895 | B1 | * | 10/2001 | Schneider et al. | 709/203 |
| 6,311,232 | B1 | * | 10/2001 | Cagle et al. | 710/8 |
| 6,345,323 | B1 | | 2/2002 | Beasley | |
| 6,378,014 | B1 | * | 4/2002 | Shirley | 710/100 |
| 6,609,034 | B1 | * | 8/2003 | Behrens et al. | 700/19 |
| 6,721,868 | B1 | * | 4/2004 | Natu et al. | 711/202 |
| 6,732,159 | B1 | * | 5/2004 | Levine et al. | 709/217 |
| 6,771,213 | B2 | | 8/2004 | Durst | |
| 6,857,132 | B1 | * | 2/2005 | Rakib et al. | 725/114 |
| 7,003,563 | B2 | * | 2/2006 | Leigh et al. | 709/223 |
| 7,039,918 | B2 | * | 5/2006 | Jones et al. | 719/310 |
| 7,058,826 | B2 | * | 6/2006 | Fung | 713/300 |
| 7,113,978 | B2 | * | 9/2006 | Beasley et al. | 709/208 |
| 7,136,946 | B2 | * | 11/2006 | Shirley | 710/62 |
| 2001/0044843 | A1 | * | 11/2001 | Bates et al. | 709/224 |
| 2004/0041832 | A1 | * | 3/2004 | Nguyen et al. | 345/736 |

FOREIGN PATENT DOCUMENTS

| | | |
|---|---|---|
| EP | 0859500 A3 | 3/2001 |
| WO | WO 99/22294 | 5/1999 |

OTHER PUBLICATIONS

International Search Report by the International Searching Authority, issued on Jul. 10, 2002, in the corresponding PCT application No. PCT/GB02/00787, and three European Examination Reports by the European Patent Office, in the corresponding European patent application No. 02702482.7.
Adder, Products Brochure, APX 304572-304579, Apr. 1, 1998, 8 pages.
AdderViewOSD, Products Brochure, RCI 173246-173279, Aug. 1, 2002.
Avocent's Pre-Markman Hearing Memorandum in Support of its Proposed Claim Constructions (Dec. 15, 2004).
Avocent Redmond's Answering Pre-Markman Hearing Briefing (Jan. 18, 2005).
Avocent Redmond's Supplemental Responses to Raritan's Second Set of Post-Remand Interrogatories (Nos. 15R-17R), Mar. 14, 2005.
Apex, OutLook User Guide, 1997.
Apex et al., Products Brochure, APX 082949-082971, 1996.
Apex PC Solutions, Users Guide, 1993.
Apex, Products Brochure, APX 018983-018996, Jan. 7, 1997.
Apex, Products Brochure, APX 019103-019121, 1995-1996.
Apex, Products Brochure, APX 056304-056346, Oct. 1, 1998.
Apex et al, Products Brochure, APX 316564-316621.
Apex et al, Products Brochure, APX 316848-316909.
Apex et al, Products Brochure, APX 316910-316969.
Apex's Sales Brochure, Sep. 1, 1998, 1 page.
Apex, SwitchBack User Guide, 1995.
Apex's Motion on the PolyCon Catalog and Supporting Memorandum, Jan. 15, 2002.
Apex's Proposed Markman Findings, Jan. 25, 2002.
Appendix1 to Apex's Proposed Markman Findings, Jan. 25, 2002.
Badman, Switching into High Gear, Network Computing, Apr. 30, 2001.
Belkin, The OmniView PRO User Manual, Jul. 16, 2001.
Bruce McNair Deposition Transcript, Case No. 01-CV-4435, May 5, 2005.
Compaq, White papers, 1996, APX 083313-APX 083326, APX 083335-APX 083389.
Ching-I Hsu Deposition Transcript, Case No. 01-CV-4435, Mar. 11, 2005.
Cybex, Director Installer/User Guide, Nov. 1996.
Cybex, 4×P & 1×P KVM Switches Guide to Applications, 1996.
Datavision, Product Brochure, 1992, 3 pages.
Declaration of Joseph C. McAlexander in Support of Apex's Motion for a Preliminary Injunction, Sep. 17, 2001.
Declaration of Joseph C. McAlexander, III in the Civil Action No. 01-CV-4435, Dec. 15, 2004.
Declaration of Sharad Malik, Ph. D., Jan. 8, 2002.
Declaration of Sharad Malik, Ph.D. (Jan. 18, 2005).
Defendant Raritan Computer Inc.'s Claim Construction Statement (Dec. 15, 2004).
Defendant Raritan Computer Inc.'s Motion for Partial Summary Judgment (Jan. 8, 2002).
Defendant Raritan Computer Inc.'s Proposed Findings of Fact and Conclusions of Law, Apr. 27, 2005.
Defendant Raritan Computer Inc.'s Reply to Avocent's Proposed Claim Constructions (Jan. 18, 2005).
Defendant Raritan Computer, Inc.'s Response to Plaintiffs Second Set of Interrogatories (Nos. 9-12), Oct. 30, 2001.
Defendant Raritan Computer, Inc.'s Second Set of Interrogatories to Plaintiff Apex, Nov. 16, 2001.
Defendant Raritan Computer, Inc.'s Supplemental Response to Plaintiffs First Set of Interrogatories (Nos. 9-12), Aug. 31, 2001.
Defendant Raritan Computer, Inc.'s Supplemental Response to Plaintiffs Second Set of Interrogatories (Nos. 9-12), Dec. 12, 2001.
Dei, Central Control of Multiple PCs Without Massive Cabling, product brochure, Nov. 1992.
Expert Report by Joseph C. McAlexander Regarding Infringement and Validity of U.S. Patent Nos. 5,884,096, 5,937,176 and 6,112,264, Jan. 3, 2001.
Expert Report by Joseph C. McAlexander Regarding Infringement and Validity of U.S. Patent Nos. 5,884,096, 5,937,176 and 6,112,264, Jan. 3, 2001. Claim Charts.
Expert Report of Michael H. Davis, Jan. 13, 2002.
Expert Report of Sharad Malik, Regarding Noninfringement and Invalidity of U.S. Patent Nos. 5,884,096, 5,937,176 and 6,112,264, Jan. 13, 2002. (Unexecuted).
File History of U.S. Patent No. 5,721,842, Feb. 24, 1998.
File History of U.S. Patent No. 5,732,212, Mar. 24, 1998.
File History of U.S. Patent No. 5,884,096, Mar. 16, 1999.
File History of U.S. Patent No. 5,937,176, Aug. 10, 1999.
File History of U.S. Patent No. 6,112,264, Aug. 29, 2000.
File History of Reissue U.S. Patent No. 5,732,212, Apr. 11, 2002. Part 1.
File History of Reissue U.S. Patent No. 5,732,212, Apr. 11, 2002. Part 2.
File History of U.S. Appl. No. 10/032,325, Jun. 14, 2004.
Findings and Conclusions, *Apex v. Raritan*, Civil Action No. 01-CV-0035, Feb. 25, 2002.
Investor's Business Daily, Box Keeps Monitors, Mice to a Minimum, Sep. 8, 1997.
Joseph C. McAlexander Deposition Transcript, Case No. 01-CV-4435, Apr. 27, 2005.
KVM Switch History, Aug. 2, 2002, 2 pages.
KVM Switches Roundup, Windows NT Magazine, Jul. 1997.
Lan Times, The beauty of Apex is a two-sided story, Nov. 20, 1995.
Lightwave Communications, Inc., Product Brochure, APX 304594-304605, Jun. 1, 1998.
Lu, E&J Int. 4-Port KVM Switch, Jul. 4, 2001.
Marksman Transcript, *Avocent v. Raritan*, Civil Action No. 4435, Feb. 3, 2005.
Marksman Transcript, *Avocent v. Raritan*, Civil Action No. 4435, Feb. 4, 2005.
Memorandum and Order on Marksman issues, Case No. 01-CV-4435, (Mar. 11, 2005).
Network Computing, Product Brochure, May 15, 1995, 5 pages.
Network Technologies Inc., Product Brochure, 1998, 2 pages.
Network World, advisement, Jul. 6, 1992.
Ocean Isle, Reachout Product Brochure, RCI 172996-173006, Jun. 1994.
PC World, New Products, May 1995, 2 pages.
PolyCon GmbH Data System Inc., product catalogs, APX 024328-042697, prior to Spring, 1995.

Press Release, Maintain Error-Free Central Control of 128 PCs from One Set of Keyboard, Mouse, and Monitor, Feb. 4, 1999, 1 page.
Protest Under 37 CFR 1.291 Filed in U.S. Appl. No. 08/969,723, Feb. 13, 1999.
Raritan, CompuSwitch, Mar. 16, 1998, 1 page.
Raritan, Dominion KSX, Jul. 19, 2003, RCI 139356-139371.
Raritan, Dominion KX and Dominion KSX, 2004, 181193-181211.
Raritan, MasterConsole MXU2, Jul. 31, 2001.
Raritan, MasterConsole II, User's Manual, 2000.
Raritan, Paragon UMT2161, RCI 147483-147505, Jul. 5, 2002.
Raritan, Paragon User's Guide, Jun. 15, 2000.
Raritan, Paragon II User Manual, 2004.
Raritan, Products Brochure, 2004-2005, p. 185899-185912.
Raritan, Product Introduction, Oct. 23, 2000.
Rebuttal Expert Report of Joseph C. McAlexander Regarding Validity and Infringement of U.S. Patent Nos. 5,884,096, 5,937,176 and 6,112,264, Apr. 11, 2005.
Rextron, Product Brochure, Aug. 1, 2002, 5 pages.
Rose Electronics, "Master Switch Installation and Operation Manual," 1991.
Rose Electronics, UltraView Installation and Operation Manual, 1991-1997.
Rose Electronics, Ultra View, Aug. 1, 2002, RCI 173332-173336.
Startech Computer Products Ltd., Product Press Release, APX 304618-304619, Feb. 1998.
Supplemental Expert Report of Bruce McNair Regarding United States Patent Nos. 5,884,096 & 6,112,264 and 5,937,176, Apr. 17, 2005.
Supplemental Expert Report of Joseph C. McAlexander Regarding Infringement of U.S. Patent Nos. 5,884,096, 5,937,176 and 6,112,264, Mar. 22, 2005.
Supplemental Expert Report of Michael H. Davis, Apr. 18, 2005.
SwitchCom, ProServer, Aug. 1, 2002, 2 pages.
Tikkler, Belkin OmniView SE 4-Port KVM Switch, Nov. 8, 2000.
Tony Dekerf and Gary D. Davis, "A Close Look At Modern Keyboard, Video & Mouse Switches," 1995.
Trial Transcript, *Apex* v. *Raritan*, Southern District of New York, Case No. 01-CV-4435, vol. 1, Jan. 2002.
Trial Transcript, *Apex* v. *Raritan*, Southern District of New York, Case No. 01-CV-4435, vol. 2, Jan. 2002.
Trial Transcript, *Apex* v. *Raritan*, Southern District of New York, Case No. 01-CV-4435, vol. 3, Jan. 2002.
Trial Transcript, *Apex* v. *Raritan*, Southern District of New York, Case No. 01-CV-4435, vol. 4, Jan. 2002.
Trial Transcript, *Apex* v. *Raritan*, Southern District of New York, Case No. 01-CV-4435, vol. 5, Jan. 2002.
Trial Transcript, *Apex* v. *Raritan*, Southern District of New York, Case No. 01-CV-4435, vol. 6, Jan. 2002.
Trial Transcript, *Apex* v. *Raritan*, Southern District of New York, Case No. 01-CV-4435, vol. 7, Jan. 2002.
Tron International, Inc., KVM Products Catalogs, 1997.
Tron International, Inc., Products Catalogs, 1996.
Tron International, Inc., Product Brochure, 1997, 4 pages.
Unisys, PW2 Advantage Series Rackmount Server, 1995.
Yee Liaw Deposition Transcript, Case No. 01-CV-4435, Mar. 3, 2005.
Yee-Shung Liaw Deposition Transcript, Case No. 01-CV-4435, Dec. 6, 2001.
The a list of docket reports in the litigation: *Avocent Redmond Corp.* v. *Raritan Computer, Inc.*, Civil Action No. 1:01-CV-04435(PKC), United States District Court for the Southern District of New York.

* cited by examiner

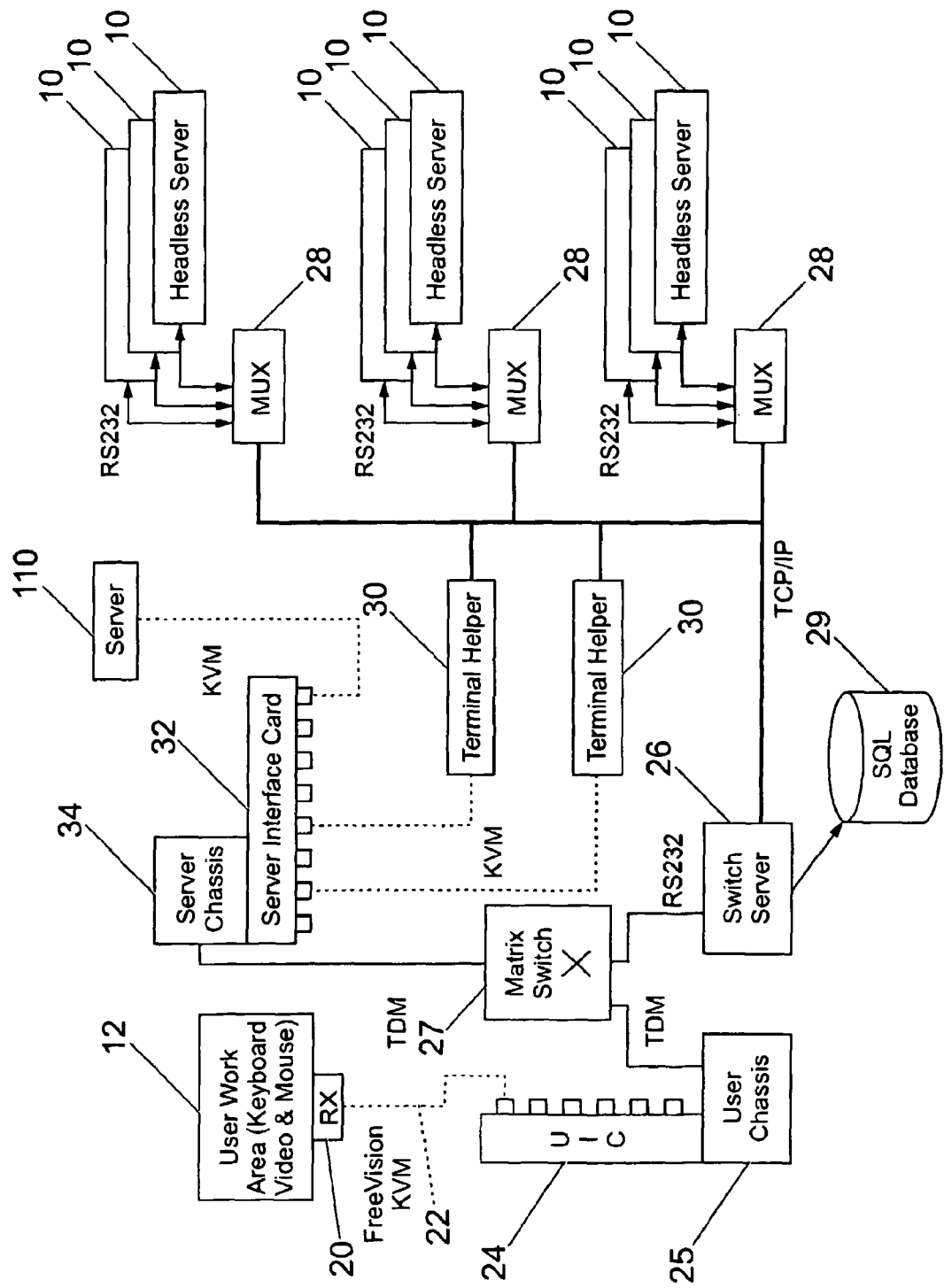

SERVER SYSTEMS

TECHNICAL FIELD OF THE INVENTION

This invention relates to the control of computer systems with multiple resources, for example multiple servers.

BACKGROUND OF THE INVENTION

There are many client/server systems which make use of a large number of servers; for example Internet Service providers, data warehouses, and software development laboratories. The management, control and maintenance of such multi-server systems can be complex and expensive.

One known arrangement is the FreeVision ™ system, which is the subject of W099/22294. This system enables workstations consisting only of video screen, keyboard and mouse to be connected to control any selected server using only serial signals over category 5 cabling. This system offers considerable advantages, but can only be used where the servers are capable of producing and handling keyboard-video-mouse (KVM) signals.

SUMMARY OF THE INVENTION

One object of the present invention is to enable the provision of a system in which a user work station can communicate with and control any selected one of a number of "headless" servers which do not themselves provide video format signals.

More generally, the present invention is concerned with enabling a user operating in one format to communicate with a resource (which may be a server or another machine, or a software resource such as a database) operating in another format in a manner which is automatic and transparent to the user.

Accordingly, the present invention provides a data processing system including one or more user stations each capable of sending and receiving data in a first form; a plurality of resources each capable of sending and receiving data in a second form; at least one helper computer arranged to transform data between the first and second forms; and a multiplexer for connecting the helper computer, or one of the helper computers, between a user and a selected resource.

From another aspect, the invention provides a method of operating a data processing system, which system comprises one or more user stations each capable of sending and receiving data in a first sending and receiving data in a second form.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

Preferred features and advantages of the invention will-be apparent from the following description and claims.

DESCRIPTION OF THE PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. It should be noted that those individuals skilled in the art may be able to make some modifications of the preferred embodiments but which are based upon the underlying teachings contained within the subject invention.

An embodiment of the invention will now be described, by way of example only, with reference to the drawing, in which FIG. 1 is a schematic block diagram of one system in accordance with the invention.

Referring to FIG. 1, the system includes a number of servers, nine of which are shown at 10. In practice, the system may include several hundred or more servers. The system also includes a number of user stations, one of which is shown at 12. In practice, there might be some tens of users. Each user station comprises a keyboard, a video screen, and a mouse, each of which communicates with an interface 20. The interface 20 permits keyboard-video-mouse (KVM) signals to pass to and from the user 10 via a path 22 using the FreeVision™ protocol.

It is desired to enable any user 12 to be connected with any server 10 in such a way that the user controls the selected server as though its keyboard, video screen and mouse were physically connected direct to the server. In this example, the servers 10 do not produce video signals in a displayable format such as VGA. The invention is based on interposing a helper computer between the user and the selected server to emulate the missing functions. It would, however, be unnecessarily complex and expensive to provide a computer for each server, or for each work station, and therefore a limited number of helper computers (which could be one, but will typically be single figures) is incorporated in the system so as to be efficiently used, as will now be explained.

Each of the servers 10 is connected to a respective port of a serial multiplexer (mux) 28. The serial mux 28 in this example is a fully non-blocking 16-to-many serial mux. It must be able to switch any serial port to any TCP/IP session. Suitable multiplexers to meet these criteria are well known in the art. Also connected to the serial mux 28 are a number of helper PCs, two of which are shown at 30, which in turn are connected to a server interface card 32.

The users 12 are connected via a user interface card 24 to a server management system (SMS) which consists of a switch formed by a matrix switch 27 and a server chassis 34, a switch server 26, and an SQL database 29 for the switch server 26.

The matrix switch 27 enables a given user port on the user interface card 24 to communicate with a given server port on the server interface card 32.

Matrix switches of this nature are known per se, and are available for example from CCC Network Systems of Farnborough, Hants, England and Belfast, Northern Ireland. The matrix switch 27 is similar to that described in WO99/22294.

The switch server 26 is also arranged to communicate by an appropriate protocol, in this embodiment TCP/IP, with the helper PCs 30 and with the serial mux's 28.

In a practical embodiment, there may be a large number of mux's such as 28, each of which will have up to 16 servers connected to it, and can have any of a number of PCs connected via TCP/IP.

When a user requests access to a particular server, the following sequence of events will be performed:

(1) The switch server 26 identifies from the database 29 the mux 28 to which the requested server is connected.

(2) The switch server 26 then makes a request for connection.

(3) According to the availability of each PC, the system attempts to propagate the request to any PC in the pool of PCs.

(4) Once a free PC has identified itself, the switch server 26 instructs the PC which mux and port to connect to, which connects the appropriate corns ports (provided not in use).

(5) The selected PC is instructed to start a terminal session with a shell command, which may usefully be stored as a string in the database 29.

(6) The PC confirms successful command execution, and the switch server 26 connects the user via the user interface card 24, the switch 27, 34, and the appropriate port of the server interface card 32.

To allow communication with the switch server 26, and to enable requests to be propagated amongst the PCs, each of the PCs contains an Ethernet card (or similar networking arrangement). Each PC also has socket listening software to accept requests from the SMS and to allow termination of the session at any time. Upon termination, all links can be broken.

The arrangement described with each PC returning its location or ID allows any number of helper PCs to be connected to the mux. A smaller number of PCs reduces cost and complexity, while a higher number minimises blocking. Expansion is simple, merely requiring an additional PC and additional data in the database. Any PC can connect to any mux via TCP/IP. Thus there is a flexible pool of resources.

The system as thus far described therefore enables any user to be connected to any desired server via a helper PC. The servers 10 in this embodiment are headless servers which do not provide formatted video signals and may not be organised to accept keyboard and mouse signals directly. The helper PC is therefore provided with terminal emulator software, so that the combination of the user workstation 12 and the terminal emulator acts as a fully featured terminal to control the selected server.

FIG. 1 also shows a server 110 which is capable of handling KVM signals, to illustrate that this can be connected directly to a port of the server interface card 34 without the intervention of a helper PC.

In the embodiment shown, the pathways labelled "KVM" carry KVM signals in analogue format. Other channels as shown operate in RS232. In a large system, this greatly simplifies cabling arrangements. However, other data transfer protocols may be used.

Our present preference is to use Linux as the PC operating system, as this avoids licensing restrictions and a large number of Unix terminal emulator programs are freely available. However, this preference is essentially commercial, and it will be appreciated that a wide choice of operating systems and emulator software would be suitable.

Thus, the PC and its installed software enable the user to interface with the server by proxy, and the PC may be referred to as a "proxy helper". The same basic technique may be used to allow interfacing by proxy with resources other than servers, "resource" in this context being used to mean any machine or database. The proxy helpers could, for example, contain web browsers to interact with web-enabled devices, or custom interfacing software to interact with, for example, air conditioning systems or alarms. The switch server will know from its database the type of resource the user requires access to and will use this information to identify a suitable proxy helper PC from its pool.

In the prior art system of WO99/22294 the helper PC acts as a computer dedicated to navigation of a large multi-user computer system. The user invokes the helper PC, identifies a list of computers he requires access to (known as a profile), and then leaves the helper PC. At this point, the switch server takes over control and allows the user to move between the computers in his profile with no further helper PC involvement. Thus, the prior art system is intentionally invoked by the user, and is used temporarily to create or modify a profile.

In the present invention, the user does not intentionally invoke the proxy helper; this is an automatic action performed by the switch server based on the type of resource the user wishes to interact with. Proxy helpers are allocated on a per-session basis. Thus, the proxy helpers are intelligently utilised by the switch server based on resource type, and the operation is transparent to the user.

The system as described is very flexible and may readily be expanded and altered without requiring much if anything in the way of specialised hardware or software.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

The invention claimed is:

1. A data processing system comprising:
    at least one user station, for sending and receiving keyboard-video-mouse (KVM) signals;
    a plurality of headless servers, wherein said headless servers provide output signals, but do not provide video format signals;
    a plurality of remote interface servers for emulating video format signals of said headless servers by means of terminal emulation software;
    a plurality of multiplexers for connecting at least one of the plurality of remote interface servers between said user station and a selected one of the headless servers wherein the user station communicates with a selected one of the headless servers via one of the plurality of multiplexers,
    a database for mapping relationship information between the multiplexers and the plurality of headless servers, and
    a switch server to communicate the relationship information to one of the remote interface servers, wherein the switch server is configured to select and make an automatic connection between the at least one user station and one of the plurality of remote interface servers, the one remote interface server being selected based on a type of resource requested by the at least one user station.

2. The system according to claim 1, wherein said connection between the at least one user station and said selected remote interface server is automatic and transparent to the at least one user station.

3. The system according to claim 1, further comprising a management unit,
    wherein said management unit is configured to respond to requests from the at least one user station to automatically establish a connection from the at least one user station to a selected one of said headless servers via said selected remote interface server and said multiplexer.

4. The system according to claim 3, wherein said management unit communicates by a network protocol.

5. The system according to claim claim 3, wherein two or more of the remote interface servers are connected to network protocol connections, said network protocol connections being connected to said multiplexer.

6. The system according to claim 5, wherein said two or more remote interface servers communicate using a network protocol.

7. The system according to claim 1, wherein said multiplexer interfaces with a non-blocking switch arrangement.

8. The system according to claim 7, wherein said non-blocking switch arrangement comprises a matrix switch.

9. The system according to claim 8, wherein said matrix switch is controlled by the switch server in accordance with data stored in the database.

10. A data processing system for use with a plurality of remote headless servers, said system comprising:
one or more user interfaces, for sending and receiving data in a first form;
a plurality of interface servers for converting data from said first form to a second form by means of terminal emulation software, said second form being used by said remote headless servers for sending and receiving data;
a multiplexer for connecting one of said plurality of interface servers between one of said one or more user interfaces and one of said remote headless servers, wherein said first form of data comprises keyboard-video-mouse (KVM) signals,
a database for mapping relationship information between the multiplexer and the plurality of remote headless servers, and
a switch server for communicating the relationship information to one of the remote interface servers, wherein the switch server is configured to select and make an automatic connection between one of the one or more user interfaces and one of the plurality of interface servers, the one interface server being selected based on a type of resource requested by the at least one user station.

11. The system according to claim 10, including a management unit,
wherein said management unit is configured to respond to a request from said user interface to establish a connection from said one user interface to the one remote headless server via said remote interface server and said multiplexer.

12. The system according to claim 11, wherein said management unit communicates by a network protocol.

13. The system according to claim 11, wherein two or more of the interface servers are connected to network protocol connections, said network protocol connections being connected to said multiplexer.

14. The system according to claim 13, wherein said two or more interface servers communicate using a network protocol.

15. The system according to claim 10, wherein said multiplexer interfaces with a non-blocking switch arrangement.

16. The system according to claim 15, wherein said non-blocking switch arrangement comprises a matrix switch.

17. The system according to claim 16, wherein said matrix switch is controlled by the switch server in accordance with data stored in the database.

18. A method for operating a data processing system, said system comprising one or more user stations for sending and receiving keyboard-video-mouse signals (KVM), a plurality of servers which do not themselves provide video format signals, a plurality of remote interface servers, and a plurality of multiplexers connected to the plurality of servers, said method comprising the steps of:
detecting a request from a first user station requesting establishment of communication with a first server;
determining which one of the multiplexers is connected to the first server;
determining a resource availability of the plurality of remote interface servers;
selecting one remote interface server from the plurality of remote interface servers based on the determination of resource availability and based on a type of resource requested by said first user station;
establishing a first connection between said first user station and one of said remote interface servers ; and
establishing a second connection between said remote interface server and a desired one of said plurality of servers via a multiplexed network;
receiving data from said user station and said desired server at said remote interface server; and
emulating missing video signals of the desired server by means of terminal emulation software at said remote interface server for transmission to said user station.

19. The method according to claim 18, wherein said first connection is made via a matrix switch.

20. The method according to claim 19, wherein said second connection is made via a multiplexed network containing said servers and said remote interface server.

* * * * *